United States Patent
Strycker et al.

(10) Patent No.: US 9,667,591 B2
(45) Date of Patent: May 30, 2017

(54) SYSTEM AND METHOD FOR MAINTAINING COHERENCE OF ASSOCATION ACROSS A NETWORK ADDRESS CHANGE OR REASSIGNMENT

(71) Applicant: Conversant, Inc., Chicago, IL (US)

(72) Inventors: Glenn L. Strycker, Evanston, IL (US); Lochlan H. Rose, Highland Park, IL (US); Maria de las Nieves Herranz, Westmont, IL (US); David K. Knutson, Winfield, IL (US); Danny Avni, Chicago, IL (US)

(73) Assignee: Conversant, Inc., Chicago, IL (US)

( * ) Notice: Subject to any disclaimer, the term of this patent is extended or adjusted under 35 U.S.C. 154(b) by 153 days.

(21) Appl. No.: 14/720,551

(22) Filed: May 22, 2015

(65) Prior Publication Data
US 2016/0344684 A1    Nov. 24, 2016

(51) Int. Cl.
G06F 15/16    (2006.01)
H04L 29/12    (2006.01)
G06Q 30/02   (2012.01)

(52) U.S. Cl.
CPC ..... *H04L 61/2007* (2013.01); *G06Q 30/0277* (2013.01)

(58) Field of Classification Search
CPC .................. G06Q 30/0277; H04L 61/2007
USPC ........................................... 709/245
See application file for complete search history.

(56) References Cited

U.S. PATENT DOCUMENTS

2013/0067062 A1* 3/2013 Gaitonde .............. H04L 61/103
                                                               709/224
2015/0106198 A1* 4/2015 Miller ................ G06Q 30/0255
                                                               705/14.52

* cited by examiner

*Primary Examiner* — Bryan Lee
(74) *Attorney, Agent, or Firm* — Blank Rome LLP (57) ABSTRACT

Network address date groups are defined that are associated with a group of electronic objects. Where network address date groups appear to relate to the same person or group, they are assigned an entity group identifier that allows tracking the electronic objects across network address changes. The entity group identifier may then be used by an advertiser or other service provider.

18 Claims, 11 Drawing Sheets

SYSTEM AND METHOD FOR MAINTAINING COHERENCE OF ASSOCATION ACROSS A NETWORK ADDRESS CHANGE OR REASSIGNMENT

TECHNICAL FIELD

The present invention relates to the field of identifying users of programmable devices, and in particular to a technique for maintaining coherence of associations between users and devices across an Internet Protocol (IP) address change or reassignment.

BACKGROUND ART

Advertisers need to track and target advertisements for users according to their interests across a proliferation of electronic devices, including mobile devices. Moreover, there is value to be had in finding and tracking groups of objects that share a common IP address, such as cookies, email hashes, device IDs and other forms of identity tokens that belong to a coherent group. However, merely tracking the IP address may have limited value, as routers can be reset or a mobile IP address may be updated due to changes in routing or location. A given IP address may be assigned to completely different groups of users over time, with each of the succeeding groups in time having unrelated different interests. Therefore, a way to identify and track groups or clusters of objects across changes in IP addresses over time would be desirable.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system. Similarly, a "computer readable medium" means a single physical medium or a plurality of media that together store information.

As used herein, the term "a programmable device" can refer to a single programmable device or a plurality of programmable devices working together to perform the function described as being performed on or by a programmable device. The programmable device can be any type of programmable device, including desktop computers, laptop computers, servers, and mobile devices, including devices containing embedded computational capability.

As used herein, the term "platID" means a platform device identifier, such as a mobile phone identifier. For example, Android®-based devices have an Android ID, while Apple iPhone and iPad devices have an Apple ID.

As used herein, the term "matchID" means an identifier of a network usage object that can be matched with an IP address, indicating some usage of that IP address. Different types of matchIDs can be identified by combining the matchID with a "match type," in some embodiments using a tuple {matchID, match type}. MatchIDs may be cookies, email hashes, platID, or other types of matchIDs. For example, in one embodiment match type 2 means that the matchID is an email hash.

As used herein, the term "IP Date Group" (IPDG) means a network address date group that corresponds to a stable time period of a collection of IDs associated with a single IP address. By definition, IPDGs never overlap in time, thus an IPDG can be uniquely identified by the tuple {IP address, first timestamp}.

An "open IPDG" is an IPDG that is still active, with currently overlapping matchIDs seen recently. An IPDG remains open for a period of time after the current date, to allow time for matchIDs to be seen. A "closed IPDG" is an IPDG is one with a break in the overlapping matchIDs.

As used herein, the term "Household ID" (HHID) means an entity group identifier, typically an arbitrary label, for a group of matchIDs that are somewhat consistent across one or more IPDGs. Thus an HHID may correspond to multiple IPDGs, and in turn, to a consistent collection of matchIDs. By assigning an HHID to one or more IPDGs, the collection of electronic objects associated with those IPDGs may be followed in time as they migrate from one IP address to another. By definition, an HHID is only associated with a single IP address at any given time, and can never overlap with another HHID.

In various embodiments, the system performing the techniques described below performs its analysis on data that contains no personal information. For example, instead of an email address, the system may use an email hash value that is a hash of an email address. In one embodiment, a third party service provider may provide an ID that stands for a person or entity that can be matched against an IP address for computation of IPDGs and HHIDs.

Although generally written below in terms of a residential household, the techniques described here are not limited to residential households, but may be used for any group that share IP addresses, such as at a workplace or retail establishment. Because people are only identifiable electronically through the electronic objects that are associated with them, the techniques disclosed here track those objects, such as cookies, email addresses, device IDs, etc. that belong or are associated with those people, as a proxy for the people with which the objects are associated.

Although generally written below in terms of activities on the Internet, the techniques disclosed herein can be used for tracking activities across any time of computer network. Similarly, although the disclosure is written in terms of IP addresses, similar techniques may be employed in networks that use other types of network addresses and communication protocols.

Figure 1:
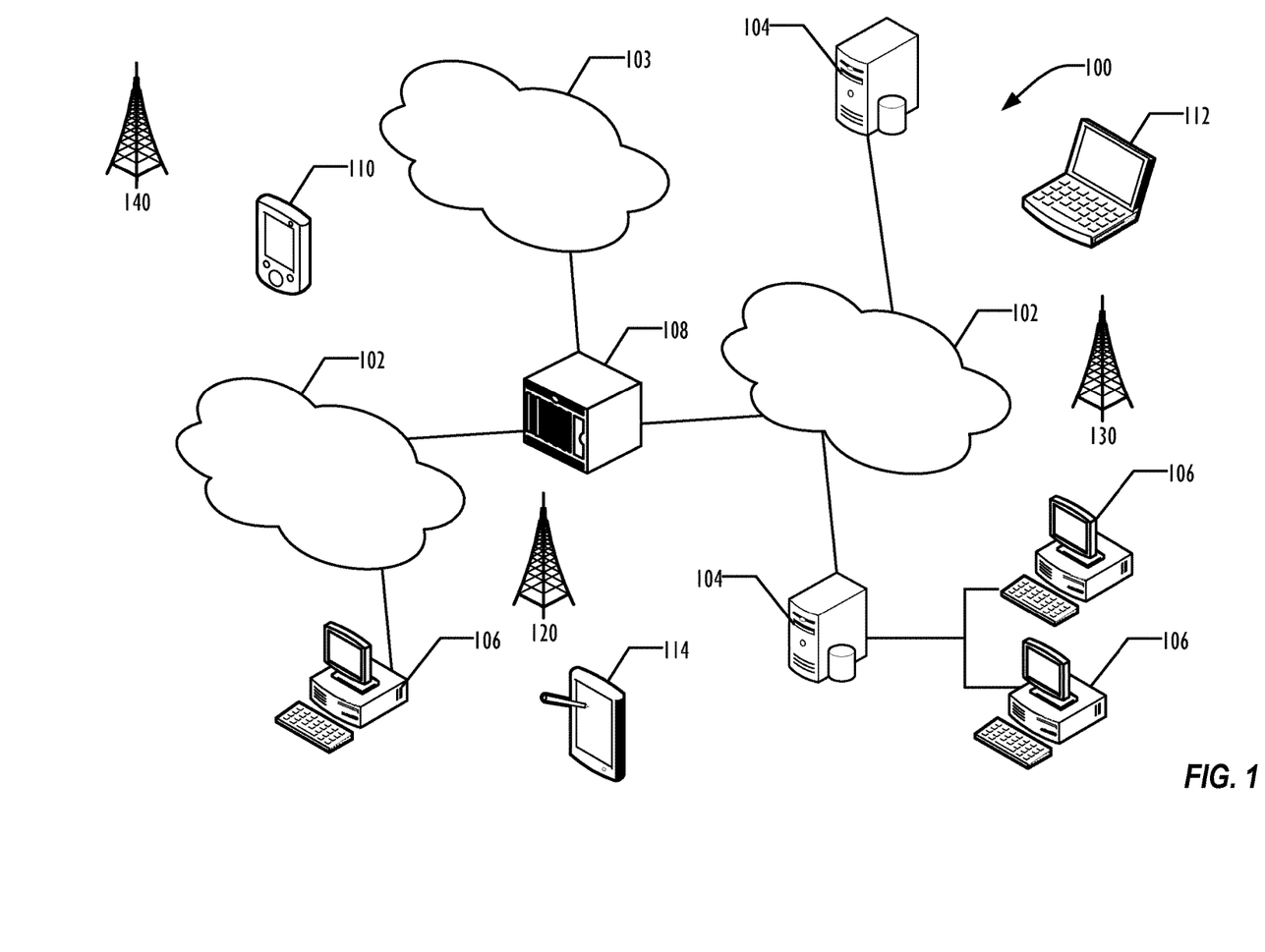
FIG. 1 is a block diagram illustrating a collection of programmable devices that may be used for generating or tracking electronic objects according to one embodiment.

FIG. 1 is a block diagram schematically illustrating a collection of networked programmable devices that may be used in the implementation of the techniques described herein. Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services, which may include providing the application to user agent mapping and analysis services described above. The functionality of the network device 210 may be implemented in any device or combination of devices illustrated in FIG. 1; however, most commonly is implemented in a firewall or intrusion protection system in a gateway or router 108.

The programmable devices that generate the data captured for determining IPDGs and HHIDs can be any of the mobile or non-mobile devices illustrated in FIG. 1. The programmable devices used for capturing the data and computing the IPDGs and HHIDs are typically server-class machines, such as one of the servers 104, that are capable of supporting large databases for storing the information used in computing the IPDGs and HHIDs.

Figure 2:
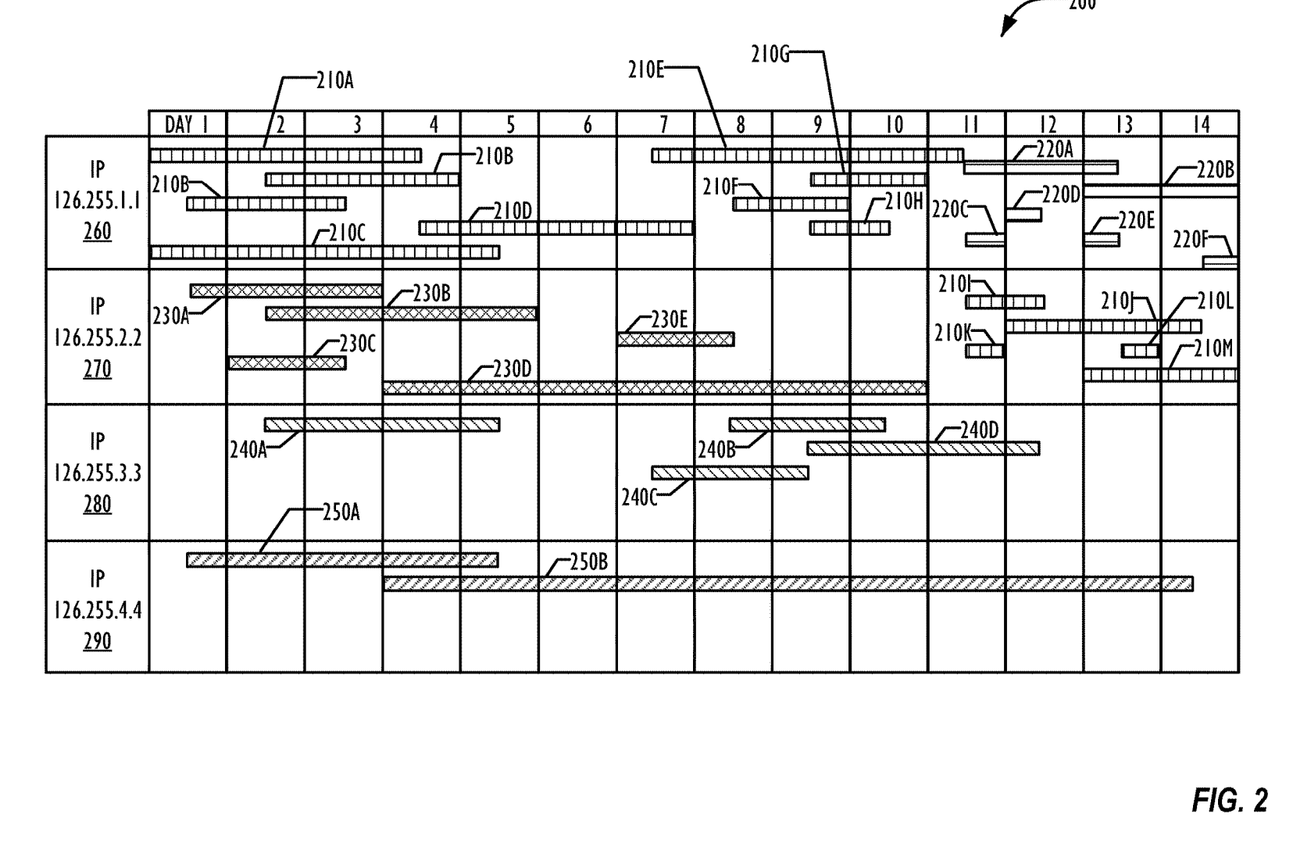
FIG. 2 is a chart illustrating observations of sets of Internet activities over time, being grouped into HHIDs according to an embodiment.

FIG. 2 is a chart 200 a series of rows 260-290, each row corresponding to a different network address. In this example, row 260 corresponds to IP address 126.255.1.1, row 270 corresponds to IP address 126.255.2.2, row 280 corresponds to IP address 126.255.3.3, and row 290 corresponds to IP address 126.255.4.4. Although the IP addresses in this example appear to be part of the same subnet, there is no necessary relationship between the IP addresses. In addition, although all of the network addresses are IP version 4 addresses, IP version 6 addresses and non-IP addresses may be encountered and used. In this figure, each individual row includes a series of bars, each bar representative of a set of network activities corresponding to the observation of a particular matchID (a particular cookie, email hash, PlatID, etc.). Each of the sets of activities logged here is grouped in the same HHID, which is an arbitrary, unique number assigned by the system corresponding to a given IP address at a given time span. HHIDs can never overlap. Such a coherent group, however, may have changes in addresses, due, e.g., to a router being rebooted. Similarly, an IP address over time may be assigned to multiple households.

In FIG. 2, overlapping usage of IP address 126.255.1.1 in row 260 can be found in bars 210A-H, which extend from day 1 through day 11. A second set of bars 220A-F has no overlap with the bars 210A-H. Thus row 260 can be considered as two IPDGs, one running from day 1 through day 11, the other running from day 11 through day 14. Similarly in row 270 (IP address 126.255.2.2), two sets of bars can be seen: bars 230A-E and bars 210I-M, forming two more IPDGs. In this example, bars 210I-M in row 270 adjoin bars 210A-H in row 260, suggesting that these two IPDGs are associated with the same group of people.

Row 280 (IP address 126.255.3.3) has two sets of bars: bar 240A and bars 240B-D. The two sets do not overlap, thus form two IPDGs. Finally, row 290 (IP address 126.255.4.4) has a single set of overlapping bars 250A-B, forming a single IPDG.

Figure 3:
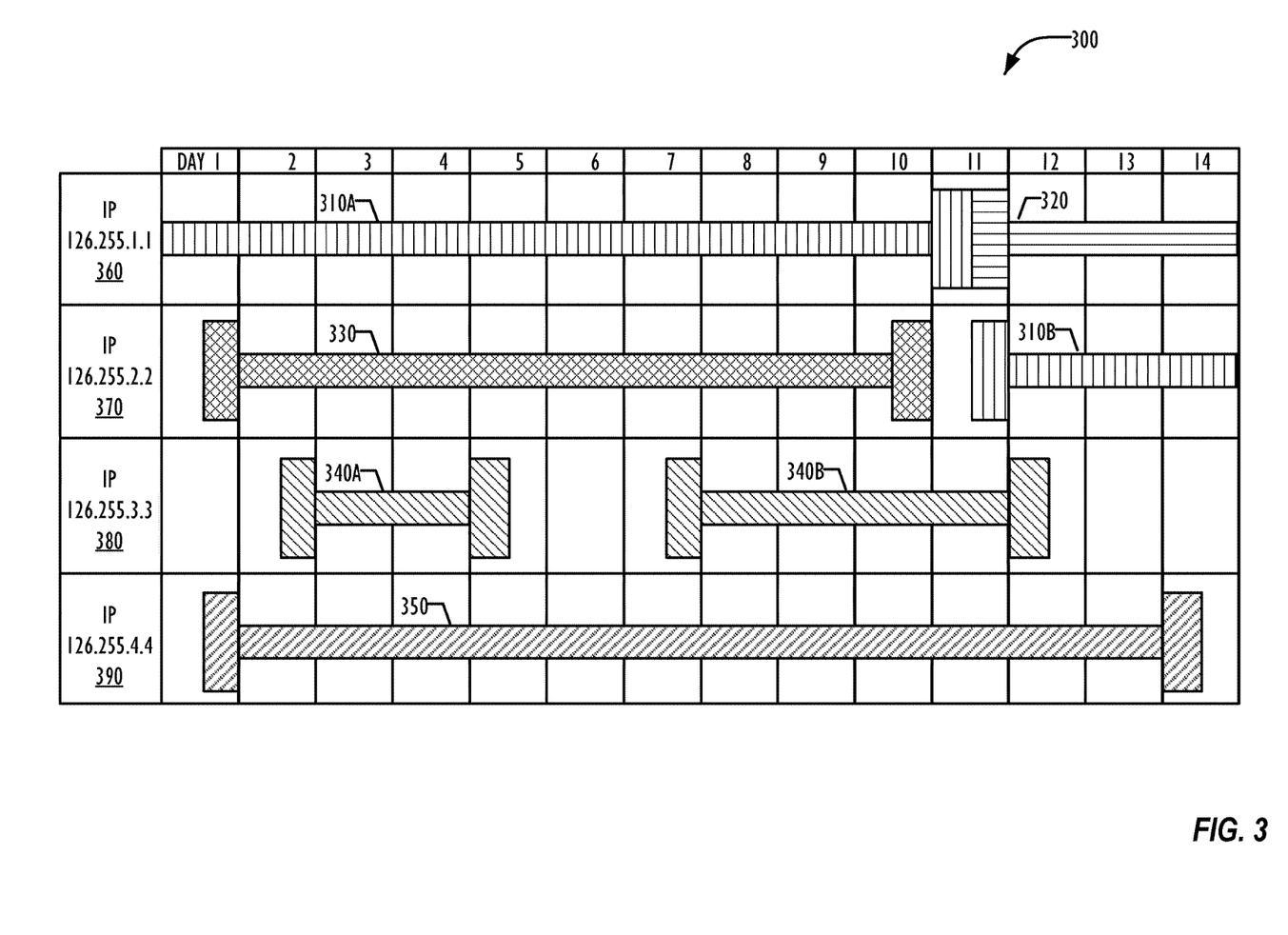
FIG. 3 is a chart illustrating IPDGs corresponding to the HHIDs of FIG. 1 according to one embodiment.

The IPDGs constructed from chart 200 are illustrated in chart 300 of FIG. 3. In this example chart, horizontal bars for the IPDG may be capped with vertical bars at either end or at both ends, indicating the closure of the IPDG at that point in time. Where an IPDG extends to the left or right end of the chart, no vertical bar caps are used, indicating the IPDG was open at the end or beginning of the charted time period, and may extend into an adjacent time period. Thus, in row 360 (IP address 126.255.1.1), IPDG 310A begins in day 1 and ends in day 11. IPDG 320 begins in day 11 and continues through day 14. In row 370, IPDG 330 begins in day 1 and ends in day 10, while IPDG 310B begins in day 11 and continues through day 14. In row 380 (IP address 126.255.3.3), IPDG 340A begins in day 2 and ends in day 5, and IPDG 340B begins in day 7 and ends in day 12. In row 390 (IP address 126.255.4.4), IPDG 350 begins in day 1 and ends in day 14. These IPDGs thus correspond to usage of an IP address for a time period where there is no break in overlaps. IPDG 310A is an open IPDG, because it begins at the beginning of the illustrated monitoring period in day 1. IPDG 320 and 310B are also open, because they continue through the end of the monitoring period in day 14. IPDGs 330, 340A-B, and 350 are closed IPDGs. The challenge is to match IPDG 310A with IPDG 310B, by assigning an HHID to a coherent group of IPDGs that span an IP address break, such as because of a router reboot. As illustrated in rows 270-200, an IP address may have time periods where no IPDG is defined for that IP address.

FIGS. 2 and 3 for clarity do not capture the time granularity that may be used by various embodiments, which typically collect information at a full timestamp level of granularity The generation and tracking of an HHID for a given coherent group across changes of IP addresses over time enables targeting content delivery over the Internet to that coherent group, even across IP address changes. In general, this is accomplished by receiving and tracking at a computer database multiple sets of internet activities, where each activity is recorded with a match ID, the IP address for such activity, and a time stamp. Embodiments automatically generate at the database a non-personal identifier for each match ID of the multiple sets of internet activity entries.

A processor having access to a given set of internet activities on the database determines whether such entries correspond to a given active IPDG stored on the database. If there is no such active IP date group, the processor may cause a new IPDG to be generated for the set of Internet activities, with the value corresponding the new IPDG being stored on the database. In such an event, activity entries corresponding to the new IPDG may be checked to determine if they match matchID data in the sets of internet activity entries of previously closed IPDGs and assign the new IPDG to a HHID associated with the other IPDG, if that HHID is not currently assigned to another live IPDG. Thus, the system transforms the sets of internet activity entries into an identifier (the HHID) which enables targeted content delivery to a given group over time, despite changes in the IP address, and these HHIDs represent chains of IPDGs that do not overlap in time, making each HHID unique. An IPDG is assigned to one and only one HHID.

One of skill in the art will recognize that the more forms of matchIDs that are available, the less chance there is that a household (or other coherent group) could simultaneously delete all of the Internet activity associated with that household, and the more likely that the techniques described herein allow matching HHIDs across different IPDGs as their IP addresses change, without false associations between two different groups that over time share an IP address.

In some embodiments, IP addresses with extremely large activity, such as millions of cookies seen per day, millions of email opens, etc., may cause difficulty with processing those activities. These IP addresses could be associated with mobile IP addresses, shared public IP addresses, Yahoo Mail service IP addresses, etc. Because of the huge cost of a database cross-join, processing those extremely active IP addresses may be difficult. In one embodiment, blacklisting may be used to eliminate such IP addresses and activities from processing.

In one embodiment, a large time window may be used for checking a maximum and an average number of hits per day. These time windows my need to be adjusted as circumstances change. In one embodiment, a cutoff threshold of a rounded 0.1% of the matchID and IP address data may be sufficient for this purposes, cutting off bad IP addresses, but not overly restricting the number of IPDGs. The threshold value may change over time as IP addresses are reassigned, so that a previously valid IP address may become blacklisted.

Figure 4:
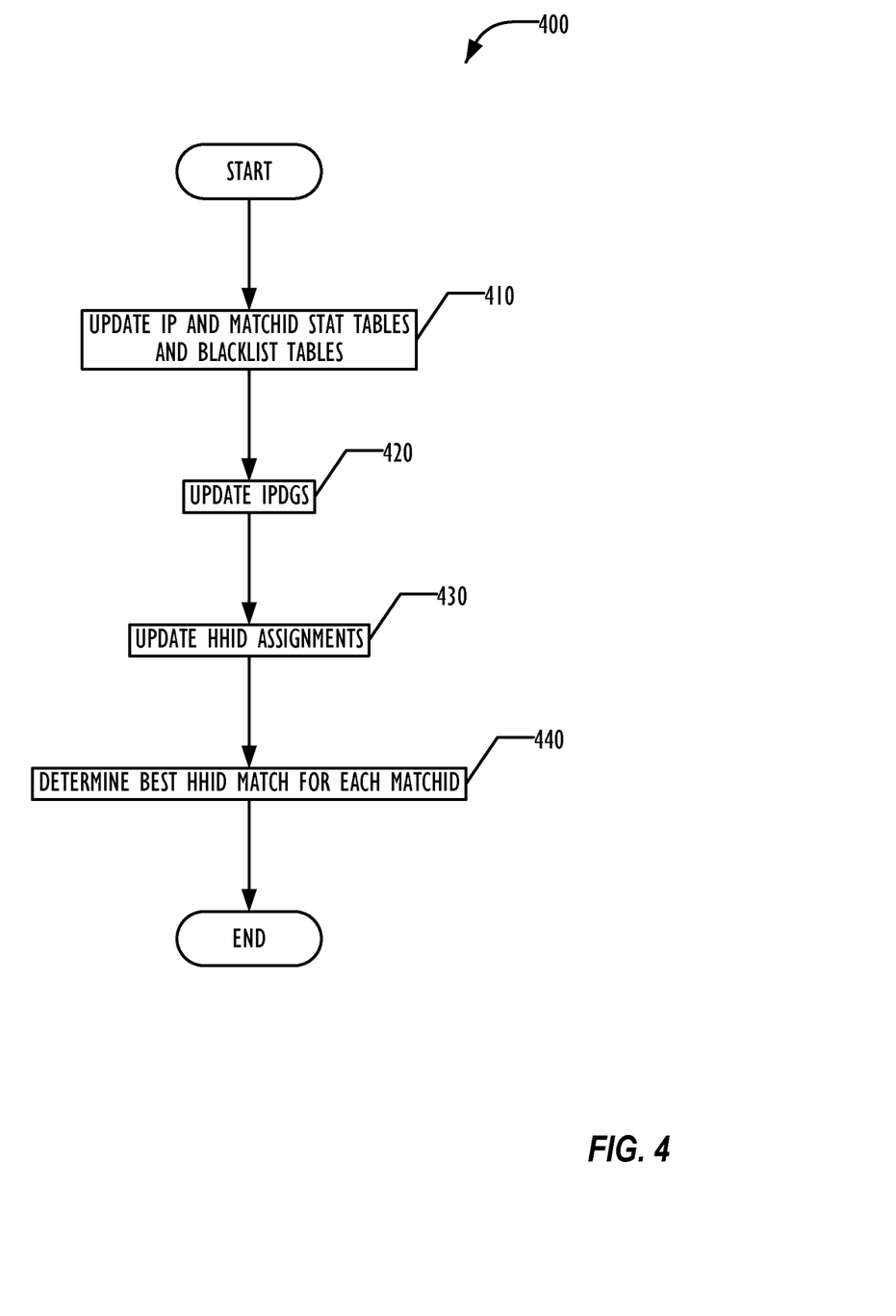
FIGS. 4-10 are flowcharts illustrating techniques for identifying and tracking electronic objects across multiple IP addresses according to one embodiment.

FIG. 4 is a flowchart 400 that illustrates at a high level a daily update procedure for generating and updating HHIDs according to one embodiment. In block 410, IP address and matchID statistics tables, as well as blacklist tables are updated. One of skill in the art will recognize that these tables may be stored in one or more databases, using any form of database organization as may be desired or convenient. Blacklisting, described in more detail below, may be used to eliminate IP addresses or matchIDs that are so active that their processing would cause difficulty.

After the various tables are updated in block 420, a main IPDG update procedure may be used to update IPDGs. In block 430, HHIDs are assigned or updated. Then in block 440 a process determines which HHID is the best match for each matchID. Each of these steps is described in more detail below.

In one embodiment, the statistics and blacklist tables are update first by summarizing the number of matchIDs seen on every IP address on every day since the last update. Then looping over all days since the last update, the max, sum, and denominator counts may be adjusted accordingly, so that things are rolled up to the IP address level. Any IP address whose statistics fall outside of a collection of predetermined ranges may be blacklisted. For match types such as cookies that may have multiple log source tables, different cutoffs with different source masks may be established. Finally, all IP address blacklists may be unioned into a single master blacklist, even though individual matchID blacklists remain separate.

Figure 5:
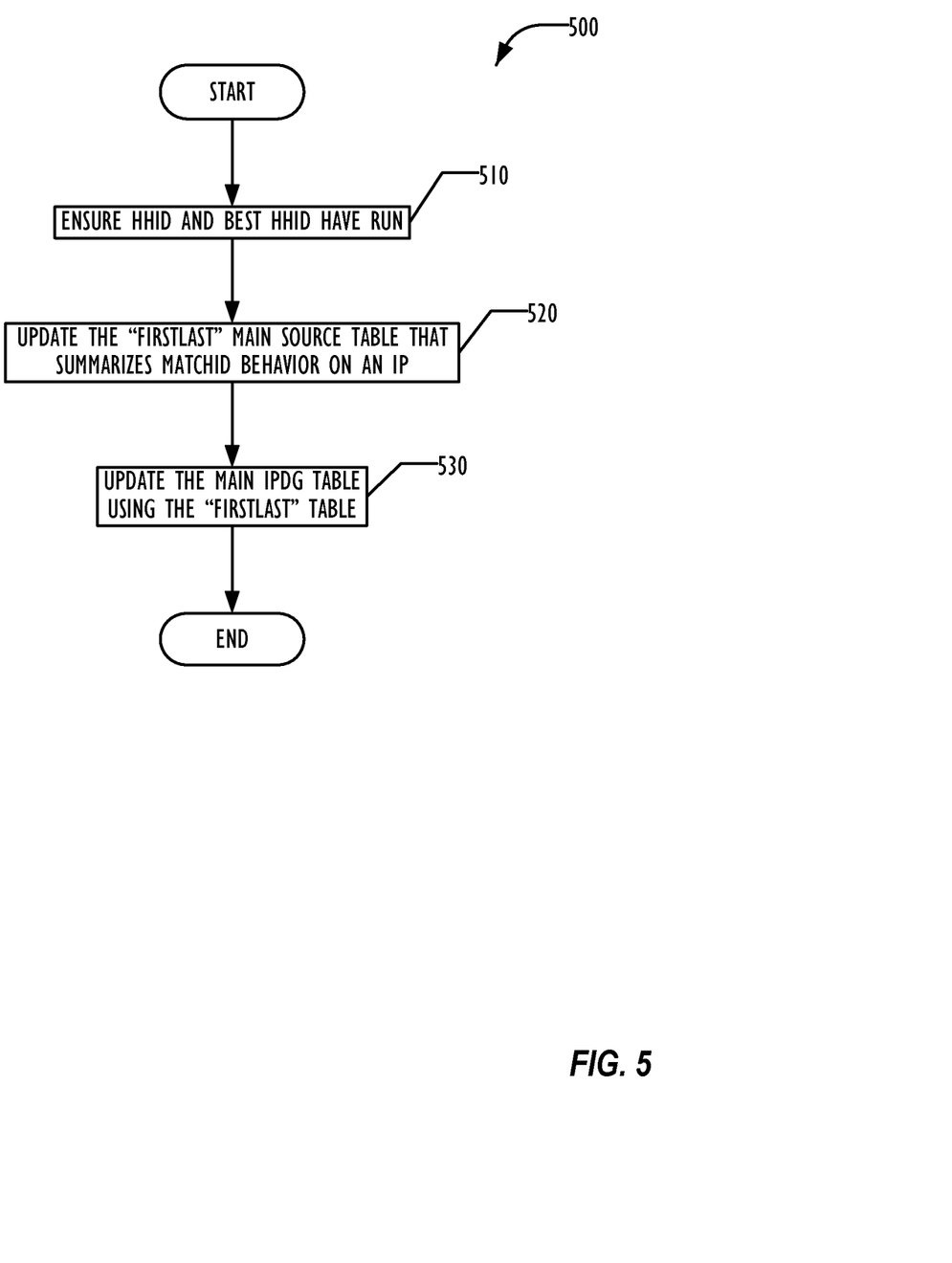

FIG. 5 is a flowchart 500 illustrating a main IPDG update technique according to one embodiment. In block 510, a check is made to ensure that the HHID and Best HHID steps from a previous update have completed, so that IPDGs are not updated until the previous update has completed. At this time, a check may be made that all of the source database tables are up to date.

Figure 6:
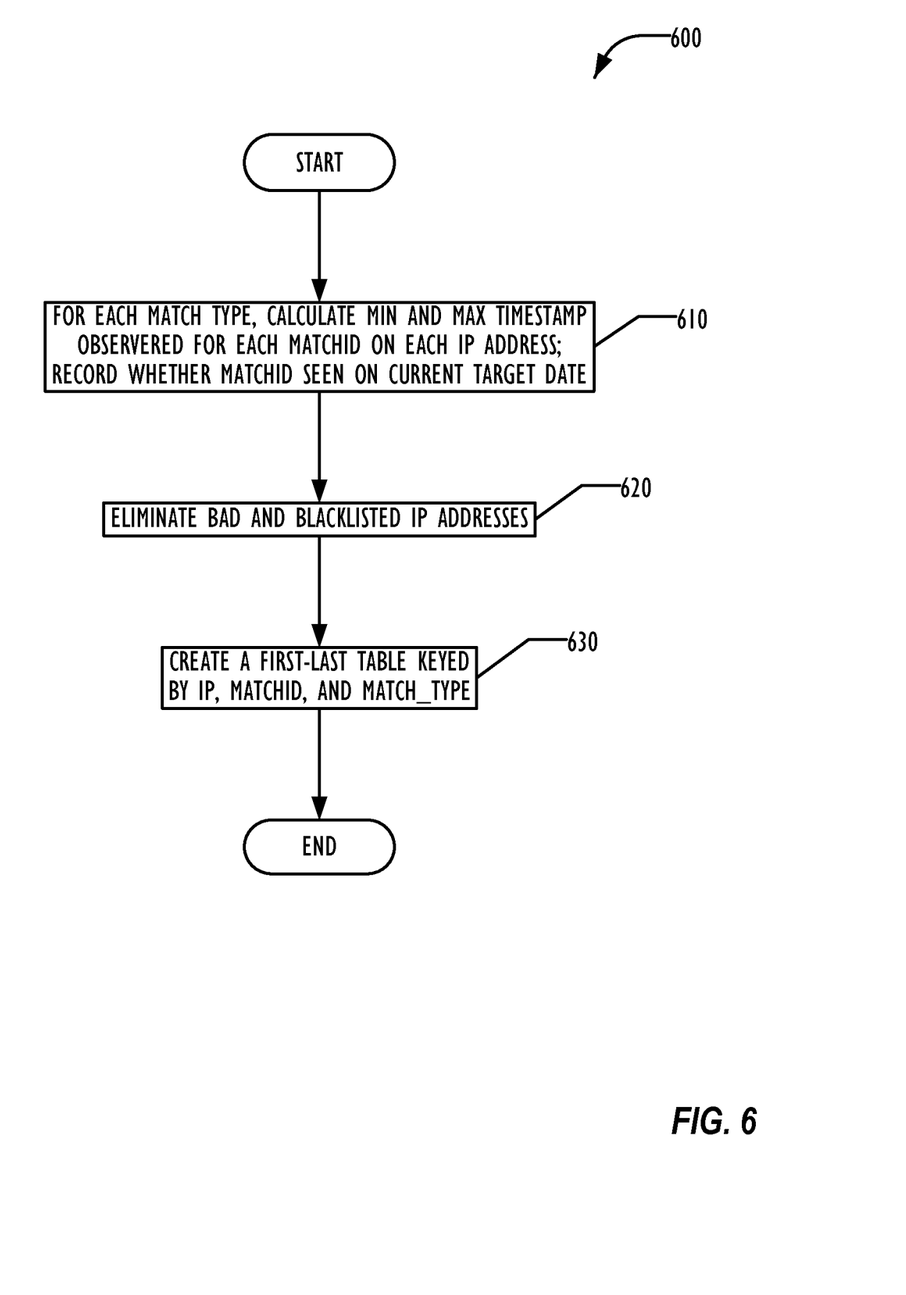

In block 520, a "firstlast" database table that summarizes matchID behavior on an IP address is updated, as described in more detail in FIG. 6. In block 530, described in more detail in FIG. 7, the main IPDG table is updated using the firstlast table created in block 520.

FIG. 6 is a flowchart 600 illustrating the technique of block 520 in more detail. In block 610, for each match_type, the corresponding database table may be examined and a minimum and maximum timestamp observed may be calculated for each matchID on each IP. In addition, whether the matchID was seen on the current target date may be recorded for use in updating stats in the final IPDG table. In block 620, blacklists of IP addresses or matchIDs may be applied to eliminate IP addresses or matchIDs that should not be processed. In block 630, the union of these temp tables may be taken as the "firstlast" table to be used as the source for the rest of the IPDG procedure. The key for the firstlast table is the tuple {IP, matchID, match_type}, so that rows from different source tables are kept unique.

Figure 7:
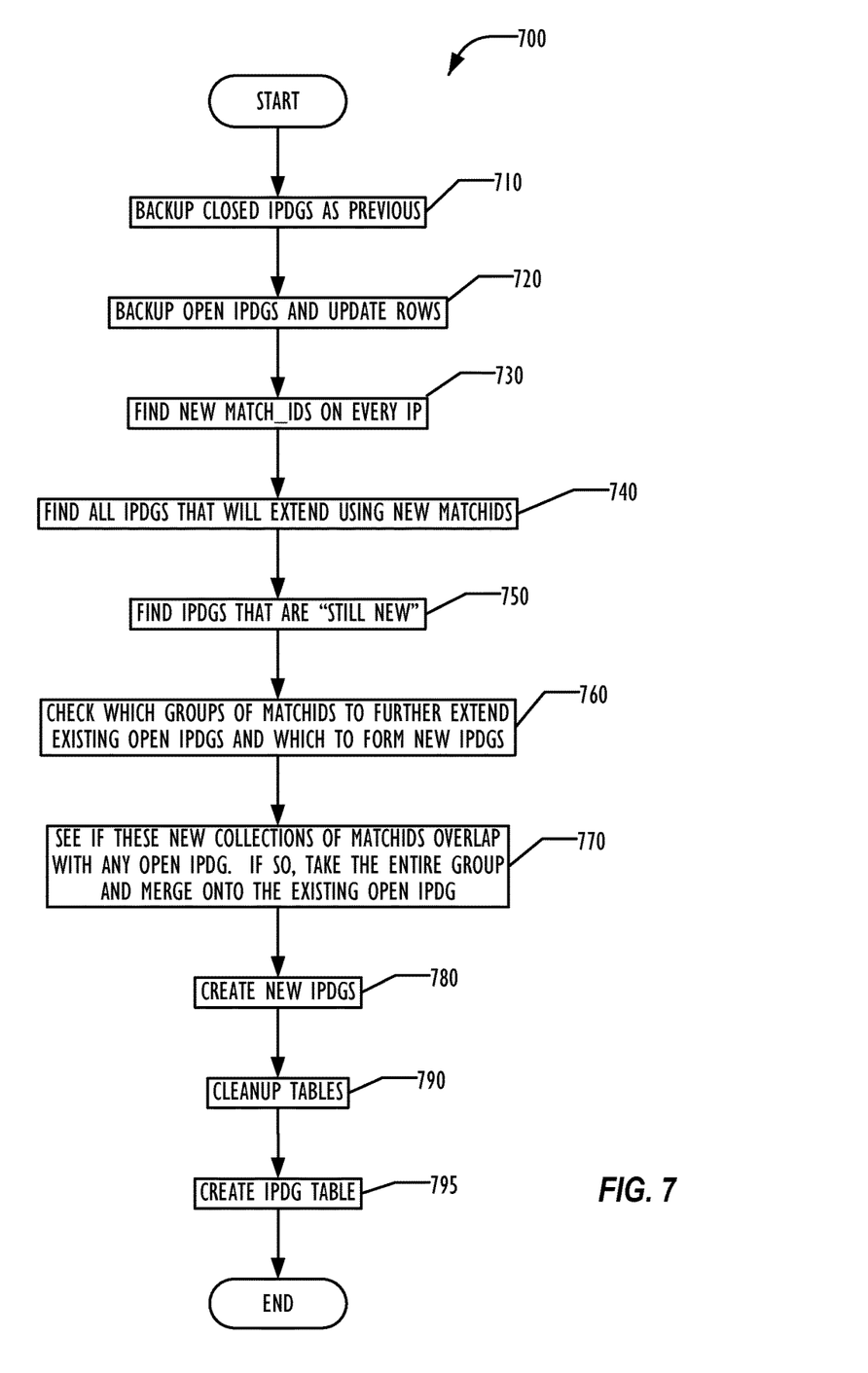

FIG. 7 is a flowchart 700 illustrating the technique of block 530 in more detail. In block 710, all closed IPDGs from the current table are backed up as "previous." In block 720, currently open IPDGs are backed up and the appropriate rows of the IPDG table are modified. In one embodiment, the current main_IPDG table is joined with the firstlast table on IP address and matchID, so that the last timestamp of that matchID can be modified. In block 730, new matchIDs are found on every IP address. (They are not present on open IPDGs.) These will either cause a currently open IPDG to extend or they may form a new IPDG. In block 740, all IPDGs are found that extend using the new matchIDs from block 730, by merging the current open update IPDG table (as modified in block 720) on the table from block 730, where the IPDG has at least one matchID with a last date greater than the current target date and the new matchID has a first date less than or equal to the current target date. This means that at least one matchID from the group overlaps this new matchID, so the new IPDG candidate can be merged into the existing IPDG. Because these are not all matchIDs that may extend the group, additional work is performed in block 770 below.

In block 750, those matchids that are "still new" are found by left joining the table in 730 with the table of block 740 and filtering. These are candidates for beginning brand new IPDGs. In one embodiment, a new IPDG is only begun if it starts on the current target date, which is safe to do because the entire procedure updates one day at a time. The system then in block 760 checks which groups of matchIDs to further extend existing open IPDGs and which to use to form new IPDGs. First, all matchIDs on an IP address that overlap the current target date are found, and the minimum first date and the maximum last date on the IP address recorded as a first table. The minimum first date and maximum last date are also calculated as a second table for all matchIDs that do not overlap the current target date. The second table is compared with the first to see if there are any matchIDs that overlap in time with the first set, and, if so, the entire IPDG components in the second table are merged with the first table, extending the final possible IPDG time window and including all matchIDs observed on this IP address in that resulting window. At this point, there could be multiple new IPDGs on an IP address, such as if several people rebooted their router on the same IP address on the target date, but this is undesirable, as this case is difficult to distinguish from an actual group of users with sparse surfing behavior. In order to clean up possible noise, the new IPDGs are ordered by length, creating a new temporary table. In one embodiment, a new IPDG must have a minimum length of 25 hours and not begin at 12:59 pm; possible new IPDGs not meeting that criteria are eliminated. The new possible IPDGs are then formed by using the time range from the temporary new IPDGs table and finding all matchIDs in the table of block 750 that overlap.

These new collections of cookies may or may not be completely new IPDGs. Recall in block 740 above that we checked for matchIDs that clearly overlapped open IPDGs that extended past the current target date, but there were IPDGs that were potentially closing that were not checked. Now in block 770 we see if these new collections of matchids (the "possible IPDG table") overlap with any open IPDG. If so, take the entire group and merge it onto the existing open IPDG.

In block 780 the remaining possible groups are taken, the extending groups of block 770 are filtered off using a left join, and the resulting groups are new IPDGs. Another cleanup is performed in block 790. In updating the existing open IPDGs, several temp tables were created and only certain matchID rows were updated. Now, the maximum last timestamp for each collection is determined and all matchIDs in the IPDG are updated to agree. The temporary tables from block 720, 740, and 770 are unioned, and the statistics for every matchID on each IP address are updated. In addition, a check is made to see if any IPDGs should be closed. If the last date of any matchID in the IPDG is the current target date, the maximum last timestamp may be set to the maximum possible last timestamp, rather than an open status marker. In one embodiment, the open status marker is a timestamp of 2999-12-13 23:59:59, but any future timestamp or any other special value may be used.

Finally, in block 795 the final main IPDG table is created as the union of all previously closed IPDGs, all updated or extended open IPDGs, and all newly created IPDGs. Once the IPDGs have been updated, HHIDs may be assigned or updated.

The default behavior is to assign a new HHID to newly created IPDGs, but existing HHIDs should be carried over from one IPDG to another when possible, for example when someone is assigned a new IP address. There should be 1-to-1 behavior between an HHID and an IPDG at any given time. That is, for any HHID there may be multiple IPDGs over time, but none of these IPDGs will overlap. Every IPDG may only have one HHID. Thus, when deciding whether to assign an old HHID to an IPDG, only "orphaned" HHIDs need be examined, thus only the list of HHIDs from closed IPDGs need be considered.

Figure 8:
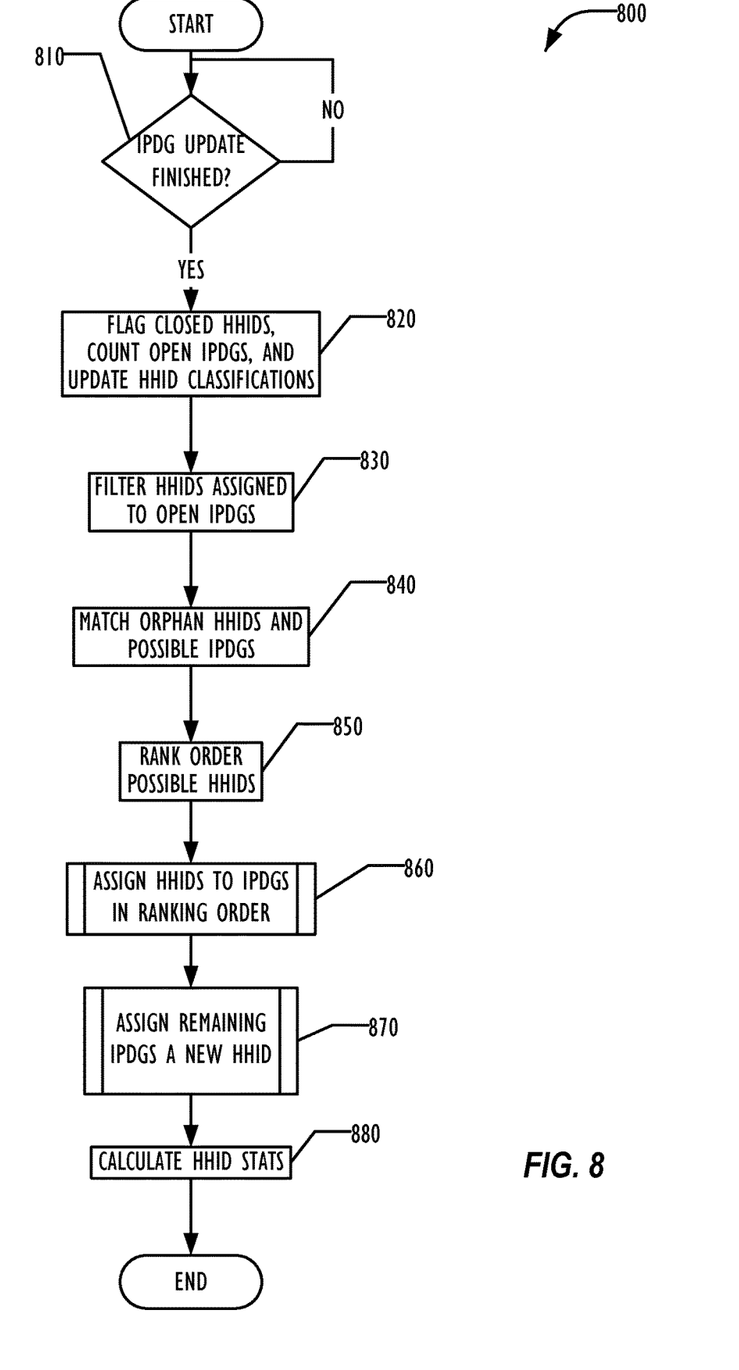

In block 810, a check is made to determine whether the IPDG update procedure has completed. If not, the HHID assignment procedure wait until the IPDG update procedure has completed. In block 820, all HHIDs are examined and those from closed IPDGs are flagged as "possibly orphan" HHIDs. The number of open IPDGs may be counted. Any HHID with an open IPDG is not eligible for the processing of block 830.

In some embodiments, HHIDs and IPDGs are categorized with classification codes. This allows assigning an HHID of the same classification as the IPDG. For example, a residential HHID would only be assigned to a residential IPDG. Other techniques for improving the quality of the HHID assignment are not limited to residential status, so other codes or identifiers could also be used.

In block 830, HHIDs from the HHID list that are currently assigned to open IPDGs may be filtered and removed. The remaining HHIDs are actual orphaned HHIDs available for reassignment. In block 840, for each possible valid orphan HHID and each possible IPDG, find all possible matches where there is at least 1 matchID in common The possible HHIDs may then be ranked in block 850. In block 860, HHIDs may be assigned to IPDGs in order of the ranking. Once a match is made, all other occurrences of that HHID or IPDG may be deleted from the available HHIDs and IPDGs. One embodiment of this assignment procedure is illustrated in FIG. 9.

Figure 10:
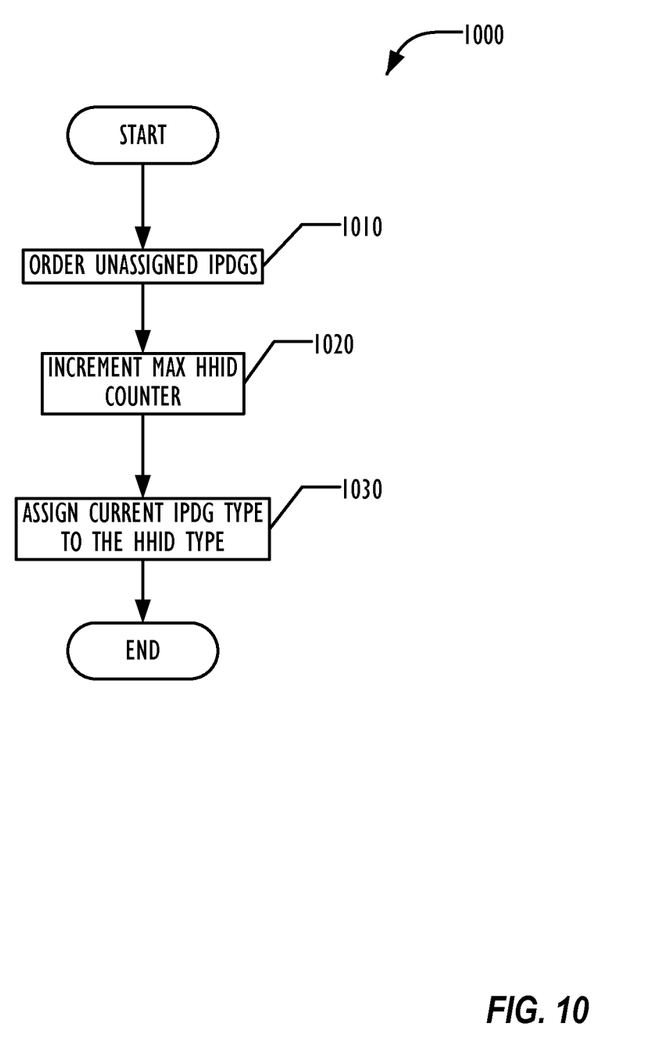

After all the HHIDs have been assigned to IPDGs in block 860, remaining IPDGs may be assigned a new HHID in block 870. One embodiment of this assignment procedure is illustrated in FIG. 10.

In one embodiment HHID statistics may be calculated for various uses in block 880. These statistics may include any or all of: (a) matchIDs in common; (b) min(min_first_datetime) for matchIDs in unassigned IPDGs; (c) max(max_last_datetime); (d) min(first_datetime); (e) max(last_datetime); (f) sum of days observations; (g) sum of link weights; (h) min(min_first_datetime) for orphaned HHIDs; (i) max (max_last_datetime); (j) min(first_datetime); (k) max(last_datetime); (l) sum of days observations; (m) sum of link weights; (n) an MD5 hash to be used for tiebreakers instead of a random number, since the MD5 hash is deterministic and repeatable; (o) a weighted average of (g) and (m) above, using (a) if (g)<0.

Figure 9:
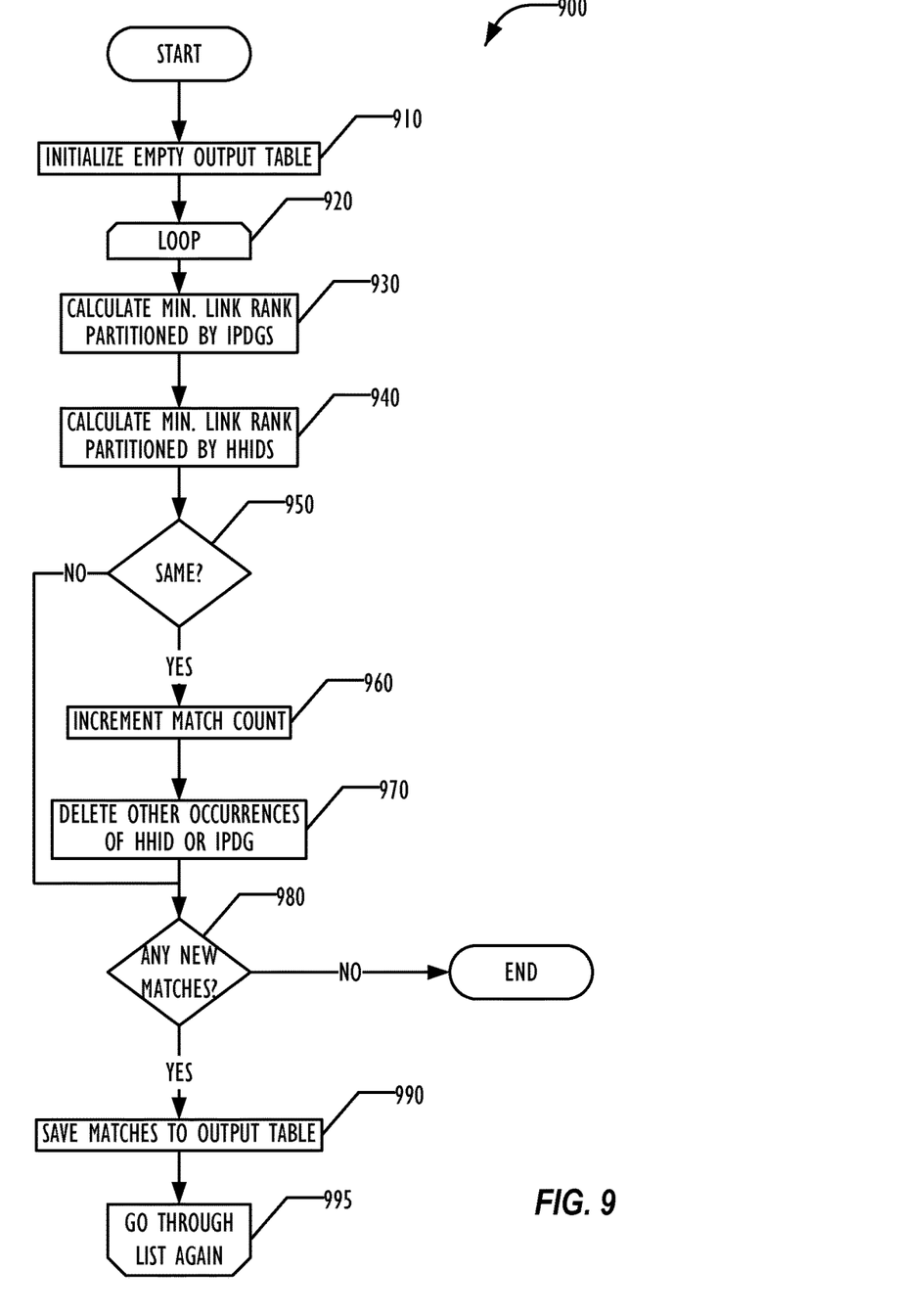

FIG. 9 is a flowchart 900 illustrating a more detailed view of the procedure identified in block 860 for assigning HHIDs to IPDGs in rank order according to one embodiment. After an assignment is made, different ranks result for the remaining pairs. In block 910, an empty output table may be initialized, then block 920-995 may be performed in a loop.

In block 930 the minimum link rank partitioned by IPDGs may be calculated, after filtering out all IPDGs and HHIDs in the current final matches. In block 940, the minimum link rank partitioned by HHIDs may be calculated, also after filtering out all IPDGs and HHIDs in the current final matches. In block 950, the two minimum link ranks are compared. If an HHID-IPDG pair both have the same minimum rank, then that HHID-IPDG match is the best possible match for both the HHID and the IPDG, a match count is incremented in block 960, and in block 970 all other occurrences of that HHID or IPDG are deleted.

In block 980, the number of new matches made in this iteration of the loop is determined. If no new matches have been made, then the assignment procedure has completed.

If any new matches were made, those matches may be saved to the output table in block 990 and the loop restarted in block 995.

FIG. 10 is a flowchart 1000 illustrating a more detailed view of the procedure identified in block 870 for assigning remaining IPDGs to a new HHID according to one embodiment. In block 1010, the unassigned IPDGs are ordered. In one embodiment the ordering may be by min_first_datetime, max_last_datetime; user IP address; and a random value for any tiebreakers needed. In other embodiments, other ordering criteria could be used to assign unique HHID identifiers to new groups. For example, some embodiments may omit the use of tiebreakers.

In block 1020, the previous maximum HHID may be determined, and a counter initialized at that value incremented by 1. Each IPDG is then assigned to a new HHID, incrementing the HHID counter after each assignment. In block 1030, the current IPDG classification type may be assigned to the HHID type when the HHID is assigned to the IPDG.

The blocks of the flowcharts described above are illustrative and by way of example only. Individual blocks may be split or joined with other blocks in various embodiments, and some blocks may be performed in other orders. Other actions may be performed in addition to those illustrated in the flowcharts.

Figure 11:
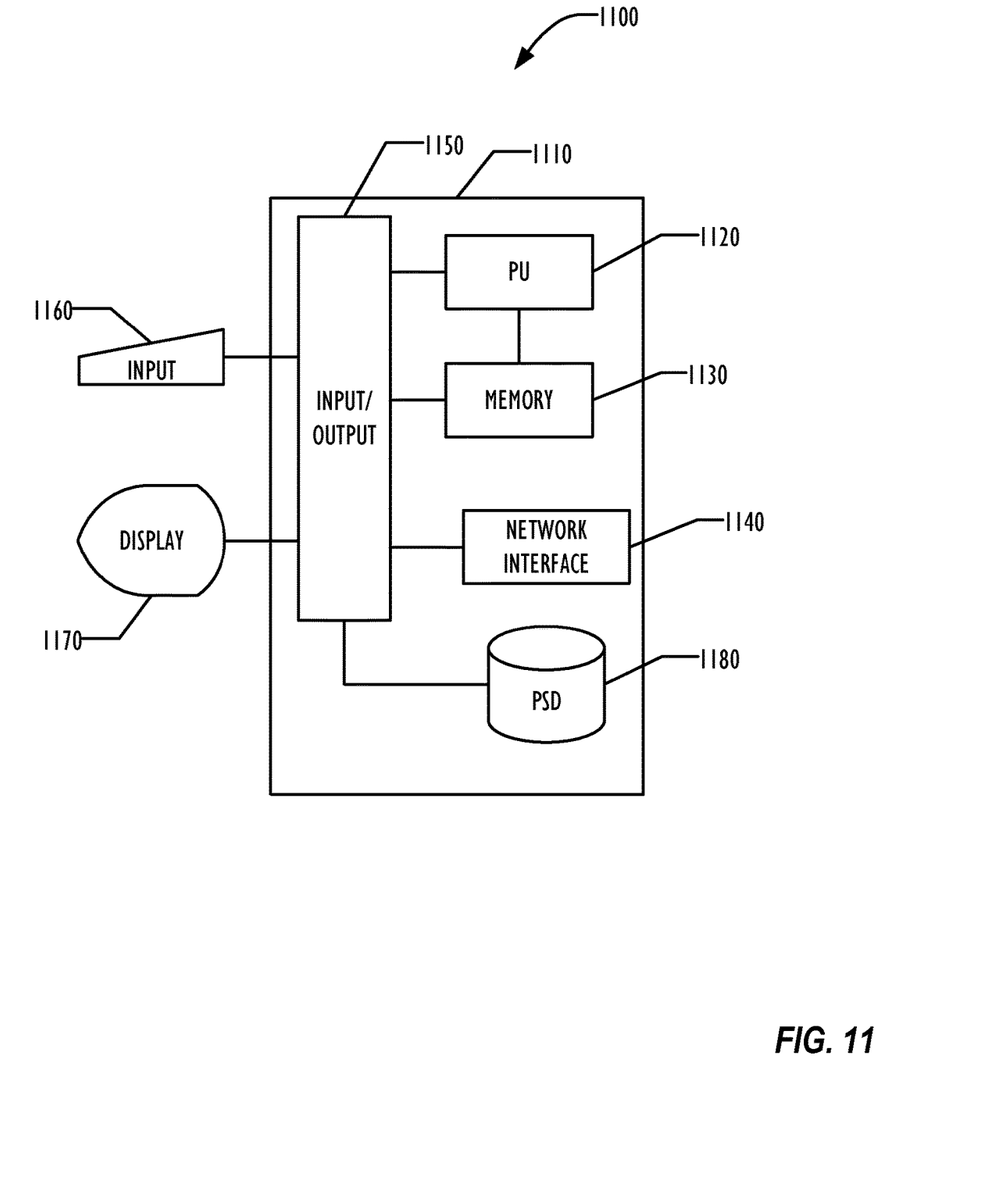
FIG. 11 is a block diagram illustrating an embodiment of a programmable device that may be used for implementing the techniques described herein.

Referring now to FIG. 11, an example computer 1100 for use in providing a system for computing HHIDs as described above is illustrated in block diagram form. Example computer 1100 comprises a system unit 1110 which may be optionally connected to an input device or system 1160 (e.g., keyboard, mouse, touch screen, etc.) and display 1170. A program storage device (PSD) 1180 (sometimes referred to as a hard disc) is included with the system unit 1110. Also included with system unit 1110 is a network interface 1140 for communication via a network with other computing and corporate infrastructure devices (not shown). Network interface 1140 may be included within system unit 1110 or be external to system unit 1110. In either case, system unit 1110 will be communicatively coupled to network interface 1140. Program storage device 1180 represents any form of non-volatile storage including, but not limited to, all forms of optical and magnetic, including solid-state, storage elements, including removable media, and may be included within system unit 1110 or be external to system unit 1110. Program storage device 1180 may be used for storage of software to control system unit 1110, data for use by the computer 1100, or both.

In some embodiments, a "best residential HHID" may be determined, providing a unique advertising identifier based on a single residential household calculated for each matchID, whereas "general HHIDs" may be location or group-centric, such as houses, businesses, airports, coffee shops, etc. Many matchIDs may be present on multiple HHIDs and their corresponding IPDGs, so an HHID alone are not unique advertising IDs. For example, if a person visits a friend's house and surfs the Internet there, that person would be seen on the person's own house's HHID and the friend's HHID. However, in most cases the person's matchIDs would only be assigned their house's HHID as their best residential HHID, because that is where the person primarily uses the Internet, and thus the best residential HHID makes a good advertising identifier. In such embodiments, each matchID has one and only one "best residential HHID."

In order to create the best residential HHIDs, embodiments may rank HHIDs for a given matchID, filter out non-residential HHIDs, then assign the highest ranked HHID for a given matchID as that matchID's best residential HHID. The best residential HHID may then be used as the unique advertising identifier. In one embodiment, the HHID ranking may be based on usage statistics, such as frequency counts; other ranking techniques may be used as desired.

System unit 1110 may be programmed to perform methods in accordance with this disclosure (an example of which is in FIG. 4-10). System unit 1110 comprises a processor unit (PU) 1120, input-output (I/O) interface 1150 and memory 1130. Processing unit 1120 may include any programmable controller device including, for example, one or more members of the Intel® Core™ processor families from Intel Corporation. (INTEL and INTEL CORE are registered trademarks of Intel Corporation.) Memory 1130 may include one or more memory modules and comprise random access memory (RAM), read only memory (ROM), programmable read only memory (PROM), programmable read-write memory, and solid-state memory. One of ordinary skill in the art will also recognize that PU 1120 may also include some internal memory including, for example, cache memory.

By defining HHIDs that can cross IPDGs as described above, collections of matchids can be identified that cross IP address changes. The HHID may then be used by an advertiser or other service provider to improve their offerings to the person or persons associated with the HHID, by giving better information about network activities of that person or persons than could be provided without the ability to track usage across IP address changes.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory computer readable medium, on which are stored instructions, comprising instructions that when executed cause a programmable device to:
    analyze a plurality of network usage objects and network addresses;
    generate a plurality of network address date groups, each associated with a network address of the plurality of network addresses and usage of the network address during overlapping periods of time by one or more network usage objects of the plurality of network usage objects; and
    calculate a first minimum link rank partitioned by network address date groups;
    calculate a second minimum link rank partitioned by entity group identifiers;
    determine a first entity group identifier of a plurality of possible entity group identifiers available for assignment to a first network address date group of the plurality of network address date groups and a second network address date group of the plurality of network address date groups responsive to the first minimum link rank and the second minimum link rank being equal;
    eliminate other occurrences of the first entity group identifier from a table of available entity group identifiers; and
    eliminate other occurrences of a network address date group assigned to the first entity group identifier; and assign the first entity group identifier to the first network address date group and the second network address date group.

2. The computer readable medium of claim 1, wherein the plurality of network address date groups to which the first entity group identifier is assigned correspond to a plurality of network addresses.

3. The computer readable medium of claim 1, wherein the plurality of network address date groups to which the first entity group identifier is assigned correspond to a single network address.

4. The computer readable medium of claim 1, wherein the instructions further comprise instructions that when executed cause the programmable device to:
update the first entity group identifier to include an additional network address date group.

5. The computer readable medium of claim 1, wherein the instructions further comprise instructions that when executed cause the programmable device to:
create a new network address date group; and
assign a second entity group identifier to the new network address date group.

6. The computer readable medium of claim 5, wherein the second entity group identifier is the first entity group identifier.

7. The computer readable medium of claim 5, wherein the second entity group identifier is a new entity group identifier.

8. A method for following a plurality of network usage objects over time, comprising:
generating by a programmable device a first network address date group associated with a first network address and usage of the first network address by the plurality of network usage objects over a first period of time;
generating by the programmable device a second network address date group associated with a second network address and usage of the second network address by the plurality of network usage objects over a second period of time; and
calculating a first minimum link rank partitioned by network address date groups;
calculating a second minimum link rank partitioned by entity group identifiers of a plurality of possible entity group identifiers;
determining a best entity group identifier available for assignment to the first network address date group and the second network address date group responsive to the first minimum link rank and the second minimum link rank being equal;
eliminating other occurrences of the best entity group identifier from a table of available entity group identifiers; and
eliminating other occurrences of a network address date group assigned to the best entity group identifier; and
assigning the best entity group identifier to the first network address date group and the second network address date group.

9. The method of claim 8, wherein the first network address and the second network address are different network addresses.

10. The method of claim 8, further comprising:
extending the first network address date group over a third period of time overlapping the first period of time.

11. The method of claim 8, further comprising:
identifying a plurality of network address date groups unassigned to any entity group identifier;
ordering the plurality of network address date groups; and
assigning new entity group identifiers to the ordered plurality of network address date groups.

12. The method of claim 8, further comprising:
eliminating network addresses from consideration for associating with a network address date group based on a blacklist.

13. The method of claim 8, further comprising:
categorizing the plurality of network usage objects.

14. A programmable device, comprising:
a programmable control device;
a memory, coupled to the programmable control device, on which are stored instructions, comprising instructions that when executed cause the programmable control device to:
analyze a plurality of network usage objects and network addresses;
generate a plurality of network address date groups, each associated with a network address of the plurality of network addresses and usage of the network address during overlapping periods of time by one or more network usage objects of the plurality of network usage objects; and
assign a first entity group identifier to a plurality of network address date groups that corresponds to a consistent collection of network usage objects associated with one or more network addresses,
calculate a first minimum link rank partitioned by network address date groups;
calculate a second minimum link rank partitioned by entity group identifiers;
determine a first entity group identifier of a plurality of possible entity group identifiers available for assignment to a first network address date group of the plurality of network address date groups and a second network address date group of the plurality of network address date groups responsive to the first minimum link rank and the second minimum link rank being equal;
eliminate other occurrences of the first entity group identifier from a table of available entity group identifiers; and
eliminate other occurrences of a network address date group assigned to the first entity group identifier; and
assign the first entity group identifier to the first network address date group and the second network address date group.

15. The programmable device of claim 14, wherein the plurality of network address date groups to which the first entity group identifier is assigned correspond to a plurality of network addresses.

16. The programmable device of claim 14, wherein the instructions further comprise instructions that when executed cause the programmable control device to:
update the first entity group identifier to include an additional network address date group.

17. The programmable device of claim 14, wherein the instructions further comprise instructions that when executed cause the programmable control device to:
create a new network address date group; and
assign a second entity group identifier to the new network address date group.

18. The programmable device of claim 17, wherein the second entity group identifier is a new entity group identifier.

* * * * *